(12) United States Patent
Jardine

(10) Patent No.: US 11,084,429 B2
(45) Date of Patent: Aug. 10, 2021

(54) TRANSPORTATION STORAGE DEVICE

(71) Applicant: Peggy Jardine, Clayton, NC (US)

(72) Inventor: Peggy Jardine, Clayton, NC (US)

( * ) Notice: Subject to any disclaimer, the term of this patent is extended or adjusted under 35 U.S.C. 154(b) by 0 days.

(21) Appl. No.: 16/678,612

(22) Filed: Nov. 8, 2019

(65) Prior Publication Data

US 2020/0148123 A1     May 14, 2020

Related U.S. Application Data

(60) Provisional application No. 62/757,711, filed on Nov. 8, 2018.

(51) Int. Cl.
    *B60R 5/00*     (2006.01)
    *B60R 5/04*     (2006.01)

(52) U.S. Cl.
    CPC ...................... *B60R 5/04* (2013.01)

(58) Field of Classification Search
    CPC ....................................................... B60R 5/04
    USPC ........................................................ 224/492
    See application file for complete search history.

(56) References Cited

U.S. PATENT DOCUMENTS

| | | | | |
|---|---|---|---|---|
| 6,203,089 B1 * | 3/2001 | Doolittle, III | .......... | B60R 13/01 296/39.1 |
| 6,206,443 B1 * | 3/2001 | Konop | .................... | B60R 13/01 229/164 |
| 6,595,568 B1 * | 7/2003 | Schroeder | ............. | B60R 13/011 296/39.1 |
| 7,448,662 B1 * | 11/2008 | Fisher | ....................... | B60R 5/04 296/39.1 |
| 7,597,373 B2 * | 10/2009 | McAuliffe, Jr. | ....... | B60R 13/011 296/39.1 |
| 2004/0188482 A1 * | 9/2004 | Wilson | .................... | A47G 9/062 224/576 |
| 2005/0218682 A1 * | 10/2005 | Klotz | ........................ | B60R 5/04 296/39.1 |
| 2005/0236450 A1 * | 10/2005 | Iannini | .................... | B63B 32/80 224/577 |
| 2013/0161364 A1 * | 6/2013 | Tirrell | ....................... | B60R 7/02 224/275 |

\* cited by examiner

*Primary Examiner* — Peter N Helvey
(74) *Attorney, Agent, or Firm* — Jeffrey C. Watson; Mathew L. Grell; Grell & Watson Patent Attorneys LLC

(57) ABSTRACT

A transportation storage device configured to prevent soiling of a vehicle interior is provided that includes a top surface and an opposing bottom surface. The top surface and the bottom surface each have a first edge, a second edge, a third edge, and a fourth edge, and the first, second, and third edges of the top and bottom surfaces are configured to securely engage one another. An edge of a flap surface may be operably engaged with the fourth edge of the bottom surface and may be configured to engage a rear bumper and/or an exterior portion of a vehicle. The transportation storage device may include at least one securing element configured to reciprocally engage the flap surface with the top surface and may include an inner pocket surface configured to engage the top surface, the inner pocket surface having a smaller area than the top surface.

7 Claims, 5 Drawing Sheets

TRANSPORTATION STORAGE DEVICE

CROSS-REFERENCE TO RELATED APPLICATION(S)

To the full extent permitted by law, the present United States Non-Provisional Patent Application hereby claims priority to and the full benefit of U.S. Provisional Patent Application No. 62/757,711, filed Nov. 8, 2018, the disclosure of which is each incorporated herein by reference in its entirety.

FIELD OF THE INVENTION

The present disclosure generally relates to a transportation storage device, and more specifically, to a transportation storage device configured to provide for secure and clean storage of soiled outdoor equipment and clothing for a vehicle to minimize the soiling of the vehicle interior.

BACKGROUND

Generally, one can transport soiled outdoor equipment, such as beach equipment, in a truckbed without fear of soiling an interior portion of a vehicle. When utilizing vehicles with trunks or other carpeted interior spaces, storing soiled outdoor equipment securely and cleanly within the vehicle becomes problematic.

Therefore, a need exists for a suitable transportation storage device that provides for cleanly storing beach equipment soiled with sand and other particles within the vehicle, while keeping the interior free from sand and other earth materials. Additionally, there exists a need to protect vehicle exteriors while loading and unloading outdoor equipment. Undesired contact between a sand covered chair and a vehicle exterior would likely lead to paint blemishes in the vehicle exterior.

BRIEF SUMMARY

Example implementations of the present disclosure are directed to a transportation storage device configured to prevent soiling of a vehicle interior. In particular, the transportation storage device may include a top surface and an opposing bottom surface. The top surface may include a first edge, a second edge, a third edge, and a fourth edge. In some aspects, the bottom surface may include a first edge, a second edge, a third edge, and a fourth edge. According to some aspects, the first edge, second edge, and the third edge of the bottom surface may be securely engaged with the first edge, second edge, and the third edge of the top surface respectively. The transportation storage device may further include a flap surface having an edge operably engaged with the fourth edge of the bottom surface. In some aspects, the flap surface may be configured to engage a rear bumper of a vehicle. According to one aspect, the transportation storage device may further include at least one securing element configured to reciprocally engage the flap surface with the top surface. The transportation storage device may further include an inner pocket surface configured to engage the top surface. According to some aspects, the inner pocket surface may have a smaller area than the top surface.

According to one exemplary aspect, the at least one securing element may further include a securing ring disposed proximate the top surface and a rotatable swivel hook disposed proximate the flap surface. In some aspects, the flap surface may further include a vehicle body engaging member. The vehicle body engaging member may be configured to operably engage the rear bumper of a vehicle.

According to some aspect, the transportation storage device may include a bottom surface configured to operably engage an interior surface of a vehicle. In one exemplary aspect, the bottom surface may include material having a pore size between a range of 0 mm and 2 mm. In another aspect, the bottom surface may include a hydrophobic material. According to another aspect, the bottom surface may be configured to reciprocally engage a bottom surface of an interior trunk of a vehicle.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

Figure 1:
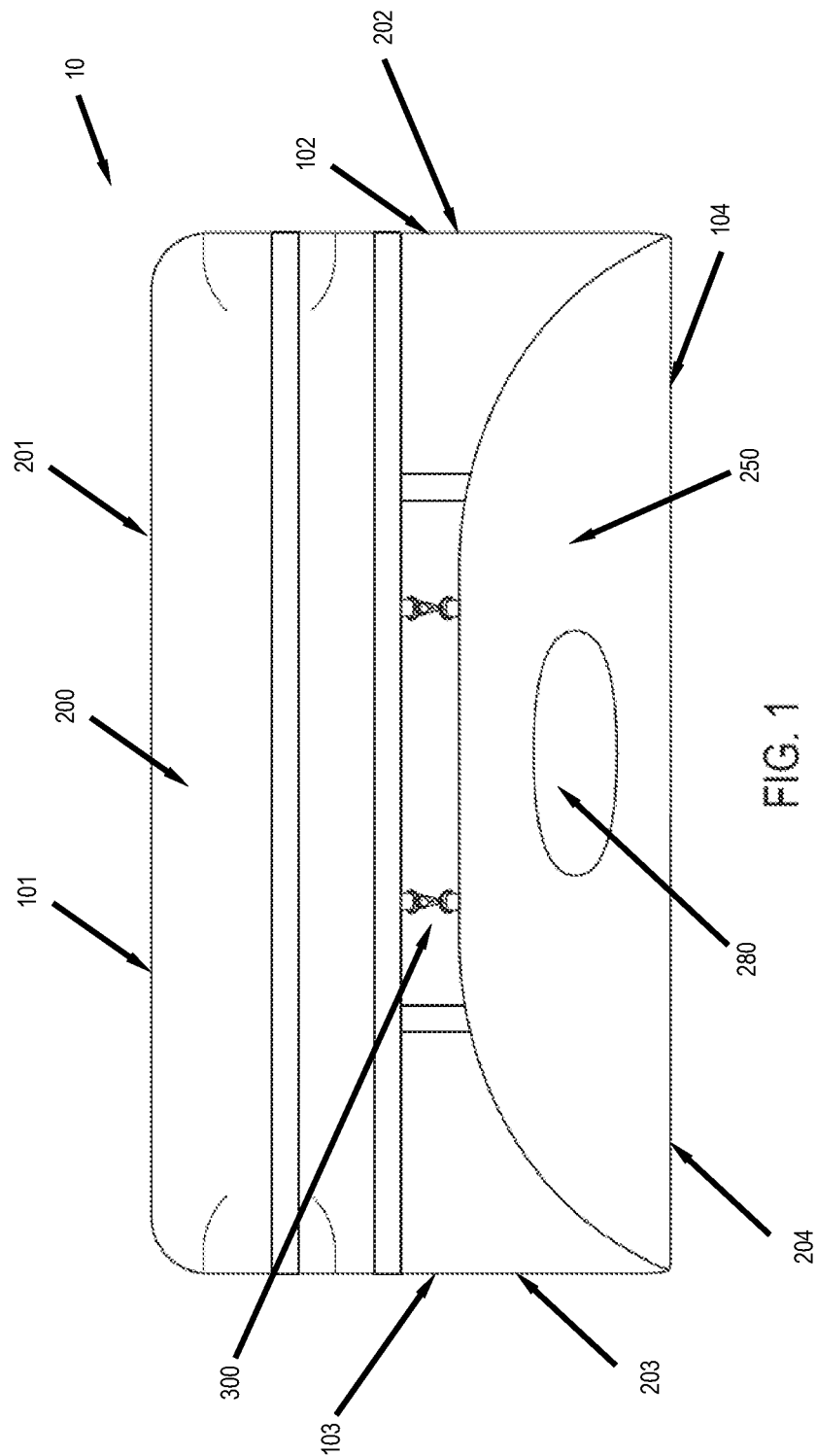
FIG. 1 illustrates a top view of a transportation storage device disposed in a secured configuration according to one example aspect of the present disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will fully convey the scope of the disclosure to those skilled in the art. As used herein, the term "and/or" and the "/" symbol includes any and all combinations of one or more of the associated listed items. Further, unless otherwise indicated, something being described as being a first, second or the like should not be construed to imply a particular order. It should be understood that the terms first, second, etc. may be used herein to describe various steps, calculations, positions and/or the like, these steps, calculations or positions should not be limited to these terms. These terms are only used to distinguish one operation, calculation, or position from another. For example, a first position may be termed a second position, and, similarly, a second step may be termed a first step, without departing from the scope of this disclosure. Additionally, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Like reference numerals refer to like elements throughout.

Figure 2:
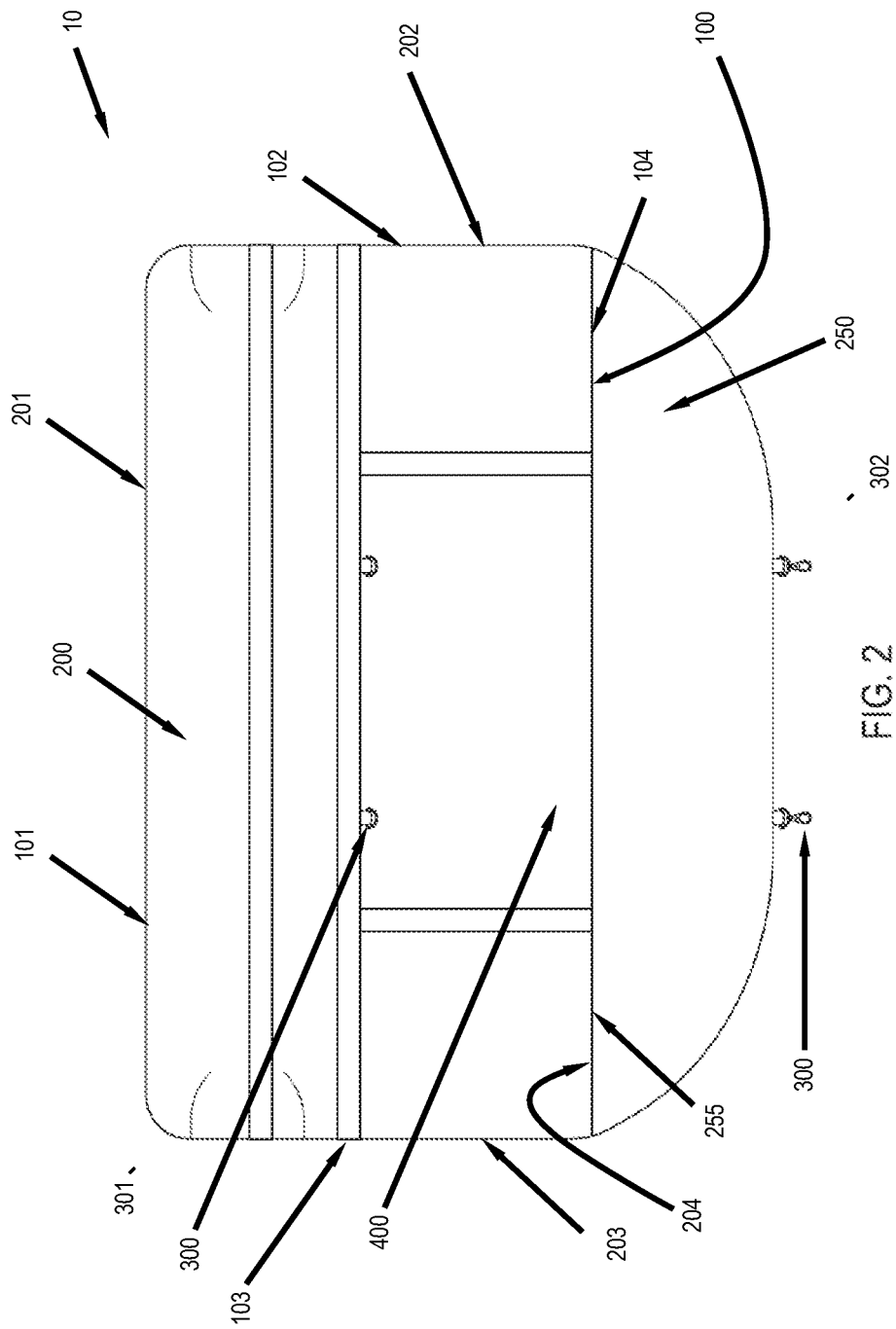
FIG. 2 illustrates a top view of a transportation storage device disposed in an open configuration according to one example aspect of the present disclosure.
Figure 3:
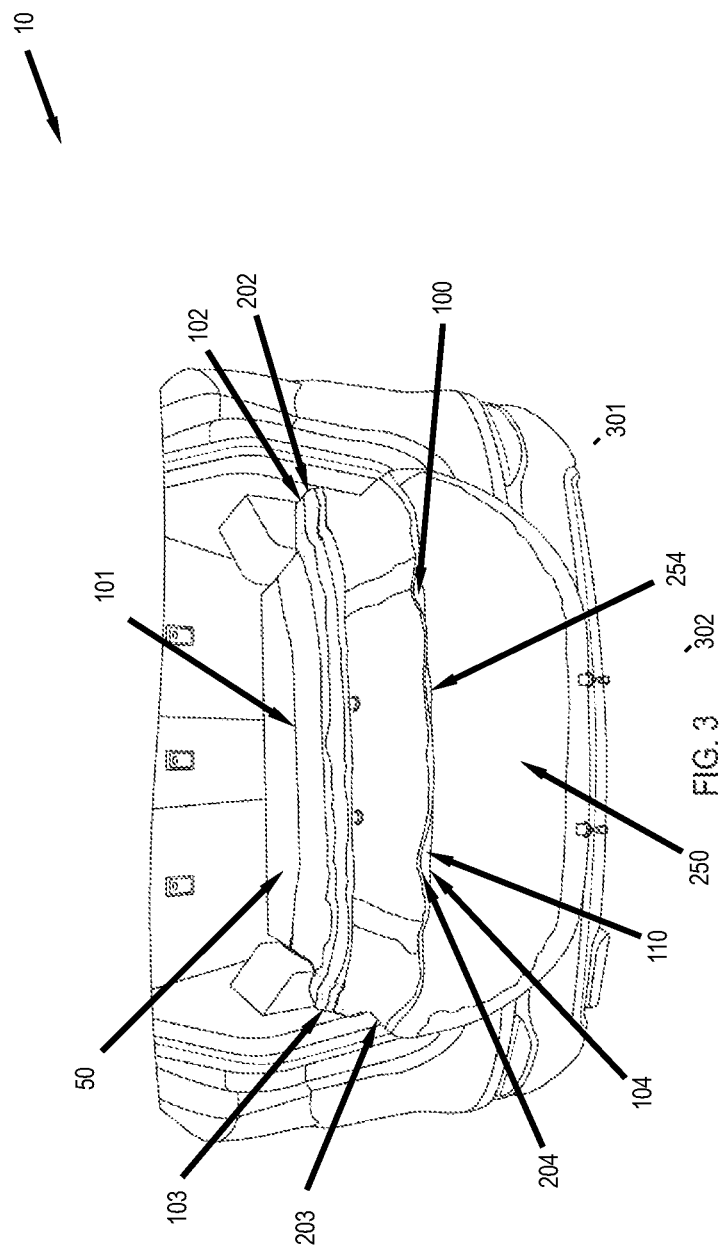
FIG. 3 illustrates a front perspective view of a transportation storage device operably engaged with an interior of a vehicle in an open configuration according to one example aspect of the present disclosure.
Figure 4:
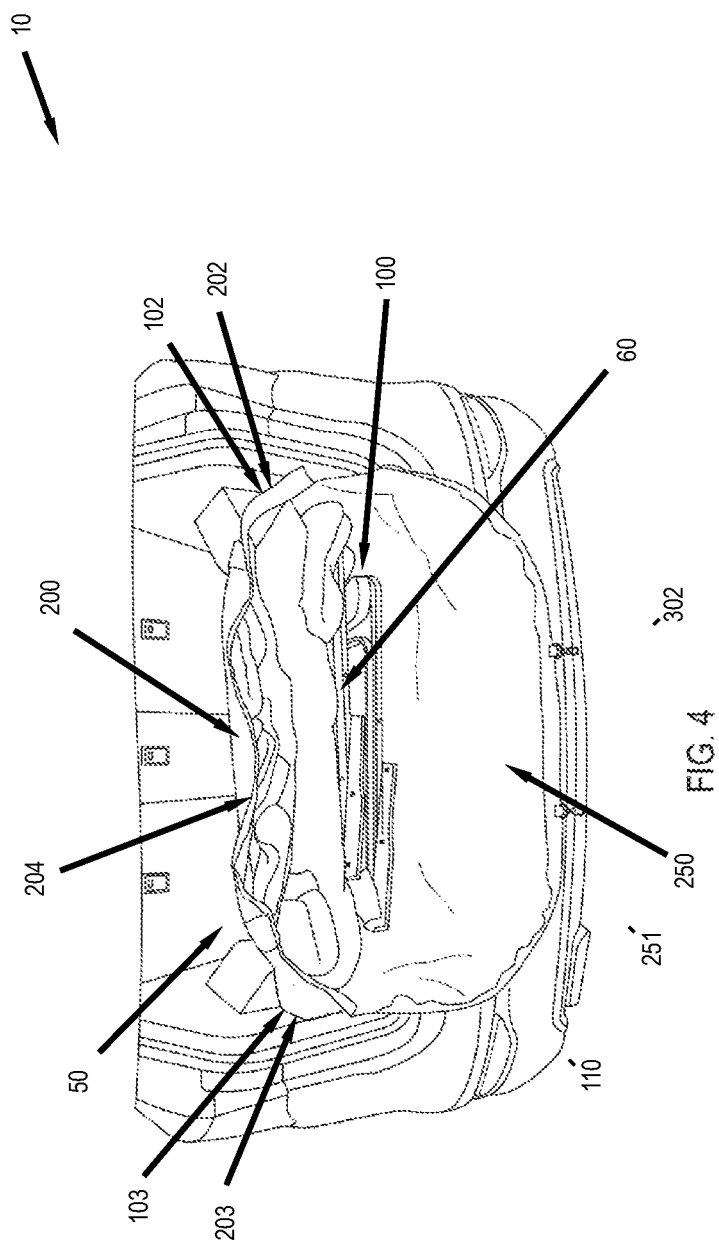
FIG. 4 illustrates a front perspective view of a transportation storage device operably engaged with an interior of a vehicle in an open configuration with soiled items according to one example aspect of the present disclosure.
Figure 5:
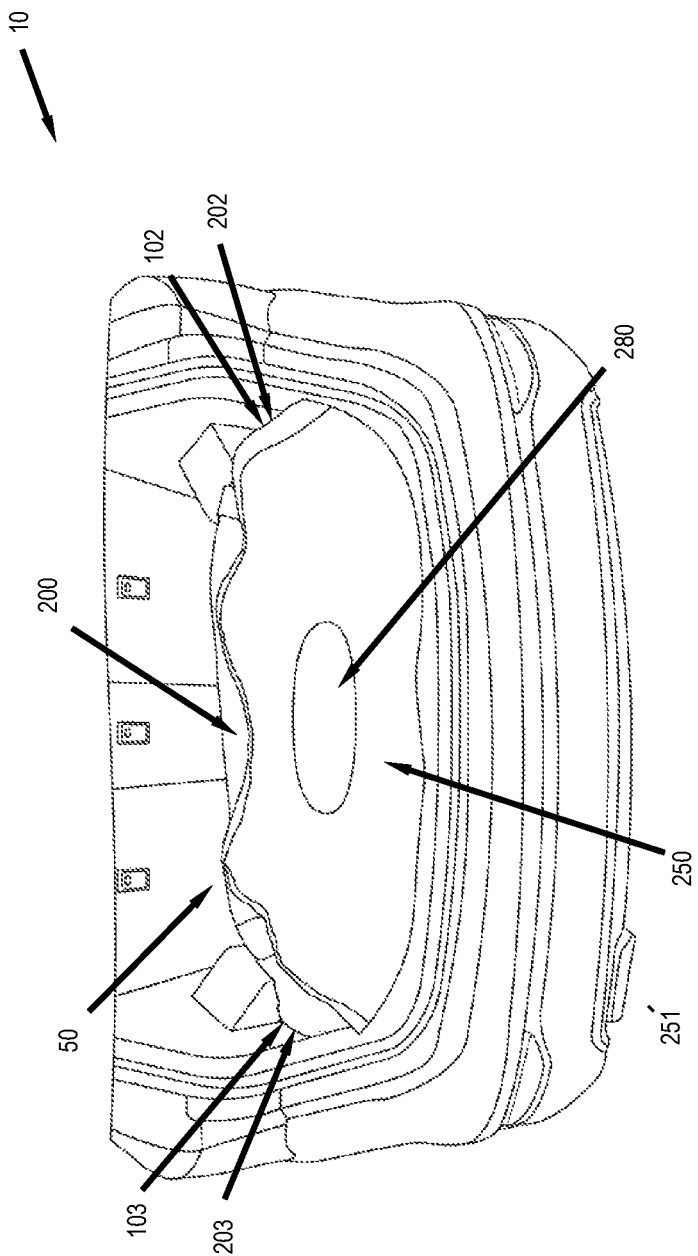
FIG. 5 illustrates a front perspective view of a transportation storage device operably engaged with an interior of a vehicle in a secured configuration with soiled items therein according to one example aspect of the present disclosure.

Implementations of the present disclosure provide for a transportation storage device as shown in FIGS. 1-5. According to some aspects of the present disclosure, a transportation storage device 10, as shown in FIGS. 1-5, may provide for cleanly and securely storing soiled outdoor equipment, such as, for example, beach equipment, tents, chairs, and/or the like within the interior of a vehicle. In some aspects, the transportation storage device 10 may provide for faster loading and unloading of soiled outdoor equipment 60 within the interior of a vehicle.

According to one aspect, the transportation storage device 10 may include top surface 200 configured to operably engage a bottom surface 100 of a transportation storage device 10 so as to create a storage compartment therein. In some aspects, the bottom surface 100 may be configured to operably and/or securely engage a flap surface 250 of a transportation storage device 10 so as to protect the interior of the vehicle from becoming soiled while storing soiled outdoor equipment and/or to protect the exterior of the vehicle from being blemished while loading soiled outdoor equipment into the vehicle.

In some aspects, the bottom surface 100 may define a first edge 101, a second edge 102, a third edge 103, and a fourth edge 104. The top surface 200 may define a first edge 201, a second edge 202, a third edge 203, and a fourth edge 204. In some aspects, the flap surface 250 may define an edge portion 255 configured to operably and/or securely engage the bottom surface 100 proximate the fourth edge 104 of the bottom surface 100. According to another aspect, the bottom surface 100 and the flap surface 250 may be integrally formed. In yet another aspect, the top surface 200, the bottom surface 100, and the flap surface 250 may be integrally formed from a single roll of material.

In some aspects, the bottom surface 100, the top surface 200, and/or the flap surface 250 may include a woven and/or a non-woven material. The bottom surface 100, the top surface 200, and/or the flap surface 250 may further include a hydrophobic material 251 configured to repel liquids and/or prevent liquids from passing through the respective surfaces. For example, the bottom surface 100 may include suitable natural materials such as cotton fabrics like terry cloth or flannel and pulp based fabrics. Suitable synthetic materials may include polyesters, polypropylenes, a combination of meltblown polymers and absorbent staple fibers such as cellulose, and/or the like. According to some aspects, the bottom surface 100, top surface 200, and/or flap surface 250 of the transportation storage device 10 may include polyvinyl acetate and/or other like materials. Combinations or blends of natural and/or synthetic materials may be used. The hydrophobic material may further include laminated absorbent articles to provide for an absorbent material layer or layers. For example, the bottom surface 100, top surface 200, and/or flap surface 250 of the transportation storage device 10 may include a waxed canvas material that includes layers of absorbent materials and/or a hydrophobic layer. According to another aspect of the present disclosure, the bottom surface 100, top surface 200, and/or flap surface 250 may include a material having pores measuring from 0 mm to about 2 mm.

Additionally or alternatively, the transportation storage device 10 may further include an inner pocket surface 400 securely engaged with the top surface 200. In particular, the inner pocket surface 400 may be stitched, glued, and/or otherwise secured with the top surface 200 so as to create a first inner pocket therebetween. Additionally, the top surface 200 and the bottom surface 100 may be securely engaged with one another so as to create a second, larger, inner pocket therebetween. For example, the first edge 101 of the bottom surface 100 may be securely engaged with the corresponding first edge 201 of the top surface 200. Likewise, the second and third edge 102, 103 of the bottom surface 100 may be securely engaged with the corresponding second and third edge 202, 203 of the top surface 200.

In yet another aspect, the bottom surface 100 may be configured to operably engage an interior surface of a vehicle interior 50. For example, the bottom surface 100 may include a semi-rigid or rigid material configured to reciprocally engage the interior surfaces of a vehicle interior 50, such as a trunk area of a vehicle. In some aspects, the bottom surface 100 may be shaped to accommodate varying surfaces of a vehicle interior such as, for example, wheel wells, transmission tunnels, and/or the like.

According to another aspect of the present disclosure, the transportation storage device 10 may include a securing element 300 configured to secure the inner storage compartments. For example, the securing element 300 may include a D-ring 301 and/or any other suitable closed, secured loop member disposed proximate the top surface 200, and a swivel hook 302 and/or any other suitable attachment device disposed proximate the flap surface 250. In another example aspect, the securing element may include portions of hook-and-loop surfaces securely affixed to respective portions of the top surface 200 and the flap surface 250.

In yet another aspect, the transportation storage device 10 may further include a vehicle body engaging member 280. In some aspects, the vehicle body engaging member 280 may include rubberized material to safely engage the exterior surfaces of the vehicle. According to another aspect, vehicle body engaging member 280 may include a magnetic material so as to temporarily, but securely engage an exterior surface of the vehicle. The vehicle body engaging member 280 may be disposed proximate the flap surface 250 so as to securely engage the flap surface to an exterior surface of the vehicle, such as, for example a vehicle bumper.

The foregoing description comprises illustrative embodiments. Having thus described example embodiments, it should be noted by those skilled in the art that the within disclosures are example only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

The invention claimed is:

1. A transportation storage device configured to prevent soiling of a vehicle interior, the transportation storage device comprising:
   a top surface and an opposing bottom surface, wherein the top surface and the bottom surface each a first edge, a second edge, a third edge, and a fourth edge, wherein the first, second, and third edges of the top surface and the bottom surface respectively are configured to securely engage one another;
   a flap surface having an edge operably engaged with the fourth edge of the bottom surface, the flap surface being configured to engage a rear bumper of a vehicle;
   at least one securing element configured to reciprocally engage the flap surface with the top surface, the securing element is configured to secure an inner storage compartment of the transportation device, the securing element including a first attachment device at a distal end of the flap surface, and a second attachment device approximate the middle of the top surface configured to reciprocally engage the first attachment device at the distal end of the flap surface, whereby the flap surface may be secured via wrapping the flap surface over the top surface with the distal end of the flap surface secured to approximately the middle of the top surface; and
   an inner pocket surface configured to engage the top surface, the inner pocket surface having a smaller area than the top surface, the inner pocket surface is secured with the top surface to create a first inner pocket therebetween;
   wherein the bottom surface, the top surface and the flap surface are a waxed canvas material that includes layers of absorbent materials, a hydrophobic layer, or a combination thereof, wherein the transportation storage device is configured to repel liquid, prevent liquids from passing through the bottom surface, the top surface or the flap surface, or combinations thereof.

2. The transportation storage device of claim 1, wherein the at least one securing element further comprises:
   a securing ring disposed proximate the top surface; and
   a rotatable swivel hook disposed proximate the flap surface.

3. The transportation storage device of claim 1, wherein the flap surface further includes a vehicle body engaging member.

4. The transportation storage device of claim 3, wherein the vehicle body engaging member is configured to operably engage the rear bumper of a vehicle.

5. The transportation storage device of claim 1, wherein the bottom surface is configured to operably engage an interior surface of a vehicle.

6. The transportation storage device of claim 1, wherein the bottom surface includes a material having a pore size between a range including 0 mm and 2 mm.

7. The transportation storage device of claim 1, wherein the bottom surface is configured to reciprocally engage a bottom surface of an interior trunk of a vehicle.

* * * * *